Patented Jan. 5, 1937

2,067,050

UNITED STATES PATENT OFFICE 2,067,050

DEWAXING HYDROCARBON OIL

Francis X. Govers, Vincennes, Ind., assignor to Indian Refining Company, Lawrenceville, Ill., a corporation of Maine No Drawing. Application May 7, 1934, Serial No. 724,460

3 Claims. (Cl. 196—19)

This invention relates to dewaxing hydrocarbon oil, and more particularly wax-bearing mineral oil.

The invention contemplates a process of separating wax from dilute wax-bearing oil by filtration in the presence of a relatively small amount of a polar substance adapted to increase substantially the rate of filtration. By polar substance, I contemplate a material adapted to exert a beneficial or modifying effect upon those constituents of the oil which hinder and impede separation of the wax from the oil in a freely filterable form.

I have found that certain solvent materials as, for example, liquid sulphur dioxide, anhydrous alcohol, acetone, methyl ethyl ketone, etc., possess the foregoing desirable characteristics.

Certain of these latter solvent materials are known to have a relatively low solubility for wax at low temperatures, and they have been employed in prior art dewaxing processes in conjunction with other solvents or diluents as antisolvents for wax. In these prior art dewaxing processes, the wax anti-solvent compounds have been used in comparatively large proportions so that, upon dewaxing at 0° F. or below, an oil having a pour test corresponding substantially to the temperature at which the oil was dewaxed is produced. In other words, the wax anti-solvent liquid material has been employed for the purpose of substantially reducing the dewaxing temperature differential.

I have found that certain compounds which I have designated as polar substances, and which may include material having an anti-solvent effect for wax, possess the ability of imparting free-filtering qualities to what would otherwise be a difficultly filterable waxy mass whereby the rate of filtration is brought within practical limits.

Thus, when it is attempted to precipitate wax from a mixture of wax-bearing oil and benzol or other diluent, the resulting crystal mass of wax is extremely difficult to filter from the mixture. However, by the addition to the mixture of a small amount of a suitable polar substance, a thinning action is observed, so that the rate of filtration is materially increased. The polar substance apparently exerts some modifying action upon tarry or other heavy constituents of the oil which normally surround the particles of wax and tend to render filtration difficult.

More specifically, my invention comprises the dilution of wax-bearing oil with a diluent solvent, such as benzol, or a light petroleum fraction, such as naphtha, chilling the resulting mixture to temperatures of below 0° F. in order to solidify the wax, and adding to the chilled mixture a relatively small proportion of a polar substance. Thereafter, the cold mixture is filtered in the usual filtering means employed in commercial dewaxing processes. If desired, the polar substance may be added to the dilute wax-bearing oil, either prior to or subsequent to chilling.

By way of example, a wax-bearing cylinder stock distillate may be diluted with benzol in the proportion of one part of wax-bearing oil to three parts of benzol. To this mixture may be added 5% of liquid sulphur dioxide by volume of the mixture, and the resulting mixture chilled to −10° F. Upon filtering this cold mixture, a filtering rate will be realized which is at least four times greater than that obtaining without the presence of this small amount of liquid sulphur dioxide.

Likewise, it has been found that substituting about 10% of acetone or methyl ethyl ketone for the liquid sulphur dioxide in the above example will also increase the filtration rate.

In either case, the amount of polar substance present in the mixture is insufficient to materially affect the dewaxing temperature differential. This may be shown by the following further example.

A wax distillate derived from Mid-Continent crude was mixed with ethylene dichloride in the proportion of about 400 parts of dichloride to 100 parts of distillate. When this mixture was chilled to −10° F. and filtered, the dewaxed oil, after removal of the solvent, had a cold test of −9° F. The solidified wax was filtered, however, with extreme difficulty. On the other hand, when about 32 parts of liquid sulphur dioxide was added to the chilled mixture of 100 parts of wax distillate and 400 parts of ethylene dichloride, and filtered at the same temperature, a dewaxed oil having the same cold test was obtained but with a filtration rate of about four times as great as was possible without the sulphur dioxide.

The invention is applicable to the dewaxing of either residual or distillate stocks, or to the separation of wax from various types of wax-bearing mixtures, regardless of the source of the oil.

The invention is not restricted to the employment of the polar substances with particular diluent solvents, since it is contemplated that the wax-bearing oil may be diluted with low-boiling aromatic hydrocarbons other than benzol, or may be diluted with aliphatic hydrocarbons comprising low-boiling petroleum fractions, such as naphtha or normally gaseous fractions, including propane and butane.

Obviously many modifications and variations of the invention, as hereinbefore set forth, may be made without departing from the spirit and scope thereof, and therefore only such limitations should be imposed as are indicated in the appended claims.

I claim:

1. In the dewaxing of heavy wax-bearing oil consisting essentially of hydrocarbons of cylinder stock viscosity and containing tarry constituents removable by solvent extraction of the oil wherein the oil is diluted, chilled to precipitate the wax, and the chilled mixture filtered to remove the precipitated wax, the method of increasing substantially the rate of filtration which comprises diluting one part of the oil with about three to four parts of a substantially non-polar diluent liquid, chilling the diluted mixture to precipitate the wax constituents, filtering the cold mixture in the presence of a polar substance of the character of sulphur dioxide, acetone and methyl ethyl ketone, said polar substance comprising about 5% to 10% by volume of the mixture of wax-bearing oil and non-polar diluent, and in an amount less than necessary to substantially reduce the dewaxing temperature differential, removing the resulting dewaxed filtrate, and recovering the solvent therefrom.

2. In the dewaxing of heavy wax-bearing oil consisting essentially of hydrocarbons of cylinder stock viscosity and containing tarry constituents removable by solvent extraction of the oil wherein the oil is diluted, chilled to precipitate the wax, and the chilled mixture filtered to remove the precipitated wax, the method of increasing substantially the rate of filtration which comprises diluting one part of the oil with about three to four parts of a substantially non-polar solvent consisting of ethylene dichloride, chilling the mixture to a temperature of the order of $-10°$ F. to precipitate wax constituents, filtering the mixture in the presence of a polar substance of the character of sulphur dioxide, said substance comprising about 5% to 10% by volume of the mixture of wax-bearing oil and non-polar solvent, and in an amount less than necessary to substantially reduce the dewaxing temperature differential, removing the resulting dewaxed filtrate, and recovering the solvent therefrom.

3. In the dewaxing of heavy wax-bearing oil consisting essentially of hydrocarbons of cylinder stock viscosity and containing tarry constituents removable by solvent extraction of the oil wherein the oil is diluted, chilled to precipitate the wax, and the chilled mixture filtered to remove the precipitated wax, the method of increasing substantially the rate of filtration which comprises diluting one part of the oil with about three to four parts of a substantially non-polar hydrocarbon diluent liquid, chilling the mixture to a temperature of $0°$ F. and below to precipitate the wax constituents, filtering the cold mixture in the presence of a polar substance of the character of sulphur dioxide, acetone and methyl ethyl ketone, said polar substance comprising about 5% by volume of the mixture of wax-bearing oil and non-polar diluent, and in an amount less than necessary to substantially reduce the dewaxing temperature differential, removing the resulting dewaxed filtrate, and recovering the solvent therefrom.

FRANCIS X. GOVERS.